United States Patent
Song et al.

(10) Patent No.: US 8,917,927 B2
(45) Date of Patent: Dec. 23, 2014

(54) PORTABLE BACKSCATTER ADVANCED IMAGING TECHNOLOGY SCANNER WITH AUTOMATED TARGET RECOGNITION

(75) Inventors: Samuel M. Song, Las Vegas, NV (US); Brian Kauke, North Las Vegas, NV (US); Douglas P. Boyd, Las Vegas, NV (US)

(73) Assignee: Telesecurity Sciences, Inc., Las Vegas, NV (US)

( * ) Notice: Subject to any disclaimer, the term of this patent is extended or adjusted under 35 U.S.C. 154(b) by 445 days.

(21) Appl. No.: 13/212,041

(22) Filed: Aug. 17, 2011

(65) Prior Publication Data

US 2012/0045127 A1  Feb. 23, 2012

Related U.S. Application Data

(60) Provisional application No. 61/374,562, filed on Aug. 17, 2010.

(51) Int. Cl.
| | |
|---|---|
| *G06K 9/00* | (2006.01) |
| *G06K 9/34* | (2006.01) |
| *G06K 9/46* | (2006.01) |
| *G01N 23/04* | (2006.01) |
| *G01N 23/20* | (2006.01) |
| *G01N 23/201* | (2006.01) |
| *G01V 5/00* | (2006.01) |

(52) U.S. Cl.
CPC .................................. *G01V 5/0016* (2013.01)
USPC ................ 382/132; 378/62; 378/70; 378/87; 382/171; 382/203

(58) Field of Classification Search
CPC ...... G06K 9/00; G06T 7/0083; G06T 7/0091; G01B 15/02; G01B 15/04; G01N 23/00; G01N 23/20
USPC ......... 378/62, 70, 87; 382/171, 203, 224, 190
See application file for complete search history.

(56) References Cited

U.S. PATENT DOCUMENTS

| | | | | |
|---|---|---|---|---|
| 6,094,472 | A * | 7/2000 | Smith | 378/86 |
| 2006/0257005 | A1* | 11/2006 | Bergeron et al. | 382/103 |
| 2008/0043913 | A1* | 2/2008 | Annis | 378/87 |
| 2010/0002834 | A1* | 1/2010 | Gudmundson et al. | 378/53 |
| 2011/0019797 | A1* | 1/2011 | Morton | 378/57 |

OTHER PUBLICATIONS

L3, "Fact Sheet, ProVision ATD", May 10 2010.*

* cited by examiner

*Primary Examiner* — Amir Alavi
*Assistant Examiner* — Kenny Cese
(74) *Attorney, Agent, or Firm* — Procopio, Cory, Hargreaves & Savitch LLP

(57) ABSTRACT

A portable backscatter advanced imaging technology scanner with automated threat or target recognition including: a floor assembly having a cantilever drive assembly for rotating the floor assembly, the floor assembly being able to be partitioned into multiple parts for reassembly; at least one x-ray tube oriented towards selected sides of a test subject; a detector assembly oriented on the circumference of the floor assembly, the detector assembly being able to partitioned into multiple parts for reassembly; a storage unit to store images from detected scattered photons on the detector assembly; and a processing unit to detect, identify and classify concealed objects on the test subject.

18 Claims, 5 Drawing Sheets

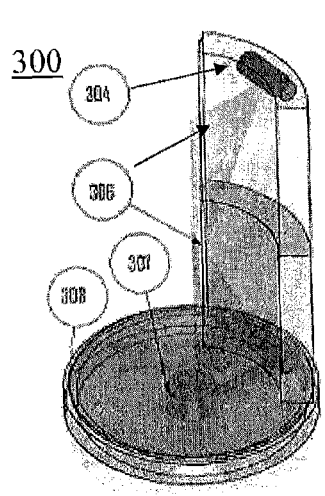
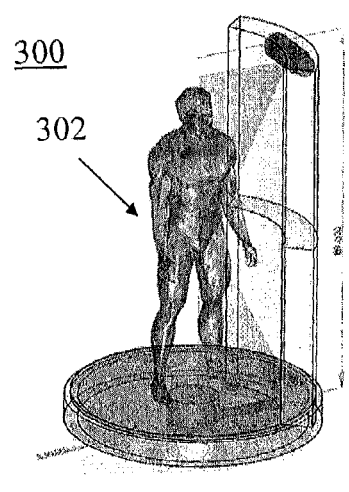
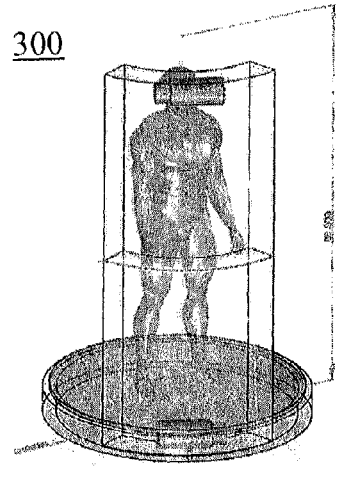
FIG. 3A          FIG. 3B          FIG. 3C
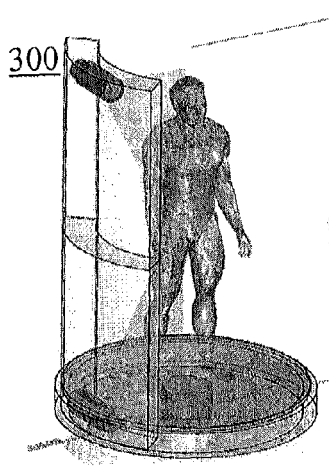
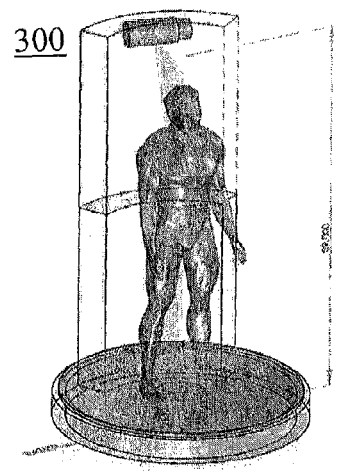
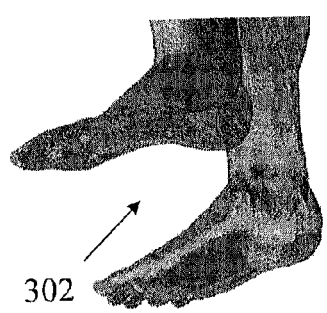
FIG. 3D          FIG. 3E          FIG. 3F

PORTABLE BACKSCATTER ADVANCED IMAGING TECHNOLOGY SCANNER WITH AUTOMATED TARGET RECOGNITION

CROSS-REFERENCE TO RELATED APPLICATIONS

This application claims the benefit of priority under 35 U.S.C. §119(e) of co-pending U.S. Provisional Patent Application No. 61/374,562, filed Aug. 17, 2010, entitled "PORTABLE BACKSCATTER ADVANCED IMAGING TECHNOLOGY WITH AUTOMATED THREAT RECOGNITION." The disclosure of the above-referenced application is incorporated in its entirety herein by reference.

FIELD OF THE INVENTION

The present disclosure generally relates to the field of X-ray imaging technologies, and in particular, to utilizing a portable backscatter advanced imaging technology scanner to detect the presence of concealed objects and other related threats or anomalies.

SUMMARY

Portable backscatter advanced imaging technology scanner with threat or target recognition capabilities is described herein. Some embodiments are summarized in this section.

Provided is a portable scanner detection system, including: a floor assembly having a cantilever drive assembly for rotating the floor assembly, the floor assembly being able to be partitioned into multiple parts for reassembly; at least one x-ray tube oriented towards selected sides of a test subject; a detector assembly oriented on the circumference of the floor assembly, the detector assembly being able to partitioned into multiple parts for reassembly; a storage unit to store images from detected scattered photons on the detector assembly; and a processing unit to detect, identify and classify concealed objects on the test subject.

Provided is also a computer-implemented method including: calibrating, via a computing device, received input image information from a portable scanner detection system and image calibration data from a database into an atomic number image; and detecting, via the computing device, threats based of the atomic number image and known threat data from a feature database.

Provided is also a system including a database to store image calibration data; a database to store known threat data; a portable scanner detection system comprising at least one x-ray, a detector assembly and a floor assembly, the detector assembly and the floor assembly being able to be partitioned into parts for reassembly; a pre-processing unit to receive image data from the scanner detection system and image calibration data from the database to output an atomic number image; and a detection unit to detect threats from the atomic number image and the known threat data.

BRIEF DESCRIPTION OF THE DRAWINGS

The embodiments are illustrated by way of example and not limitation in the figures of the accompanying drawings in which like references indicate like elements.

FIGS. 3A, 3B, 3C, 3D, 3E and 3F illustrate different perspective views of a portable scanner system according to an embodiment of the present disclosure.

DETAILED DESCRIPTION

Figure 1:
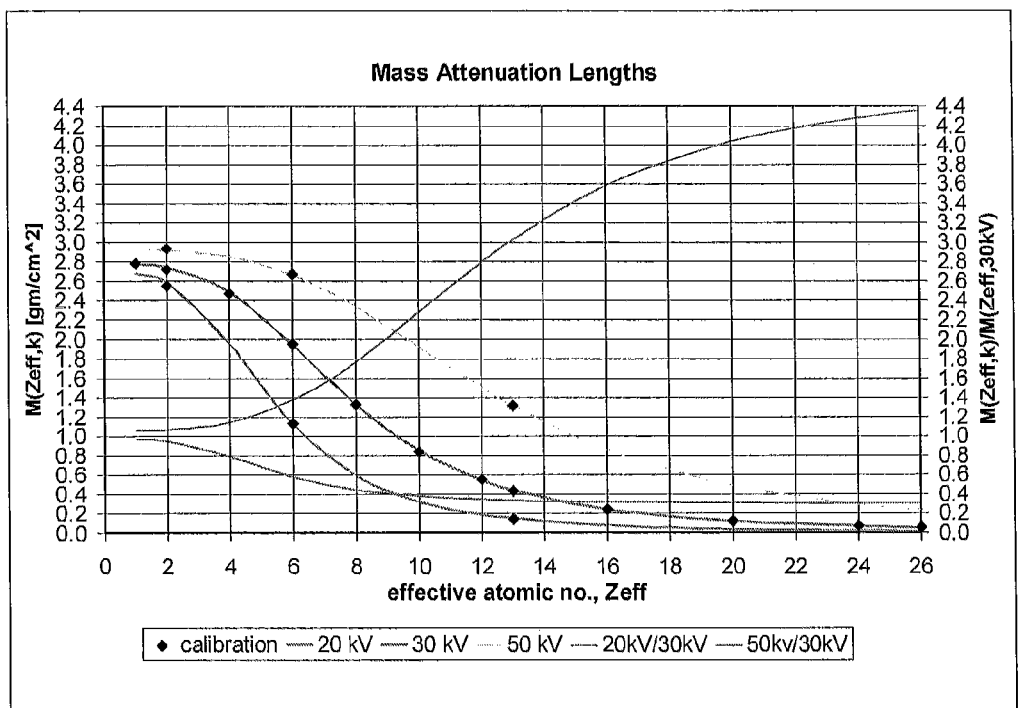
FIG. 1 illustrates mass-attenuation lengths for different X-rays at different effective atomic numbers, according to an embodiment of the present disclosure

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

The use of headings herein is merely provided for ease of reference and shall not be interpreted in any way to limit this disclosure or the following claims.

Reference in this specification to "one embodiment" or "an embodiment" or the like means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

In one embodiment, the present disclosure is directed to an advanced imaging technology scanner system with target recognition capabilities that will detect all types of concealed threats and anomalies using dual energy backscatter X-ray technology without requiring the passengers to remove their headwear and/or footwear. The photon energy and intensity (kVp and mA) as well as the inspection time will be selected to maximize contrast so that a few percent difference in the effective atomic number $Z_{eff}$ and/or density $\rho$ will be distinguishable.

The portable scanner system of the present disclosure differs from existing scanners in several aspects as described below in at least four benefits and advantages: First, vertical raster scanning of the pencil beam (instead of horizontal raster scanning as in all existing backscatter X-ray scanners) allows imaging of (with approximately the same dose): the sides of a test subject; and the shoes (footwear) and the head (headwear) of the test subject as well. Second, scintillating plastic detectors allow the scanner to be light weight and portable. Third, dual energy approach allows estimation of effective atomic number $Z_{eff}$. Fourth, incorporation of target recognition tools and experience gained from other related security systems will maximize the overall performance (e.g., high detection probability with low false alarm probability).

The performance of the disclosed portable scanner is measured in terms of the receiver operating characteristic (ROC) generated by using two sets of portable scanner data: one with and one without anomalies/threats. The performance of the proposed portable scanner system can then be compared with that of existing and future scanner systems.

The description of the technology includes an analysis of the scanner hardware components, which include components for raster scanning of X-ray pencil beam. The raster scanning may be implemented using a combination of various techniques including but not limited to the following techniques: X-ray detection with scintillation plastic and photomultiplier tubes, which are commonly used in Astronomy; Data acquisition (12 bit A/D) systems; Mechanical rotation systems; Scanner software components (target recognition)—Target recognition tools have been developed for other security imaging systems (e.g., liquids) and have shown excellent performance. The basic summary of the system of the present disclosure is a portable scanner that is an integration of several different components with some additional software (target recognition and operation software).

The proposed technical approach may include hardware design goals such as portability and efficient operation (dose and time) as well as software design goals such as efficient screening via target recognition. Ongoing related efforts also show that the target recognition used by the present disclosure showing excellent performance in a recent government sponsored study and how certain target recognition algorithms have already been implemented for the scanner of the present disclosure. The solution approach is to generalize and extend the current target recognition implementation to the portable scanner of the present disclosure, incorporate a feature database to recognize threats. The technology that can be used for the proposed portable scanner includes: (i) vertical raster of the X-ray pencil beam (instead of horizontal raster) to obtain a more complete X-ray data; (ii) dual-energy X-ray backscatter detection by scintillating plastic and photomultiplier tubes; and (iii) special target recognition techniques (tuned) for the proposed scanner. Key technical goals include (i) maximizing the number of photons detected and (ii) meeting probably of failure/detection goals with novel algorithms.

The portable scanner system of the present disclosure (which may be referred to herein as "the portable scanner system") is based on backscatter X-ray imaging principles, where the X-ray beam is raster scanned horizontally and the detector assembly takes a single energy measurement. The basic operating principle of backscatter X-ray systems is briefly reviewed below, including an internal study on the theoretical basis for the estimation of $Z_{eff}$ for dual energy backscatter X-ray measurement.

Backscatter X-ray imaging systems are based on two key components: formation of the pencil beam and the capturing of backscatter X-rays. The pencil beam can be formed with a horizontal/vertical slit collimator followed by a rotating disc with radial slits for raster scanning or by a pair of opposing spiral slits that rotate.

Based upon an analysis of basic backscatter X-ray imaging systems, a definite relationship may be established between the number of detected photons and the effective atomic number $Z_{eff}$. To be more precise, the mass attenuation length $M(Z_{eff}, L)|_{L=\infty}$, which can be computed via the X-ray measurement, can be parameterized as shown below:

$$M(Z_{eff}, E, L)|_{L=\infty} = \frac{a}{1 - 2(E/\mathrm{mc}^2) + (26/5)(E/\mathrm{mc}^2)^2 + b(E/\mathrm{mc}^2)^{-3}(Z_{eff}/137)^p}$$

where, a, b and p are constants to be determined, E is the photon energy, and L is the penetration depth assumed to be large.

FIG. 1 illustrates mass-attenuation lengths for different X-rays at different electron effective atomic numbers, according to an embodiment of the present disclosure. Specifically, FIG. 1 shows calculated values for the quantity of the mass attenuation length, $M(Z_{eff}, E, L)$, for various body tissues and tissue equivalent plastics and an arbitrary group of other materials such as polyethylene, TNT, KCN, water, aluminum and iron. What is also shown here is the ratio of $M(Z_{eff}, E, L)$ at two different energies which illustrates the possibility of converting high and low energy measurements to the effective atomic number $Z_{eff}$. FIG. 1 also illustrates, for example, the mass attenuation lengths for X-rays at 20, 30, and 50 keV for different effective atomic numbers. Also shown are the ratios of mass attenuation lengths at 20 and 30 keV and at 50 and 30 keV.

Figure 2:
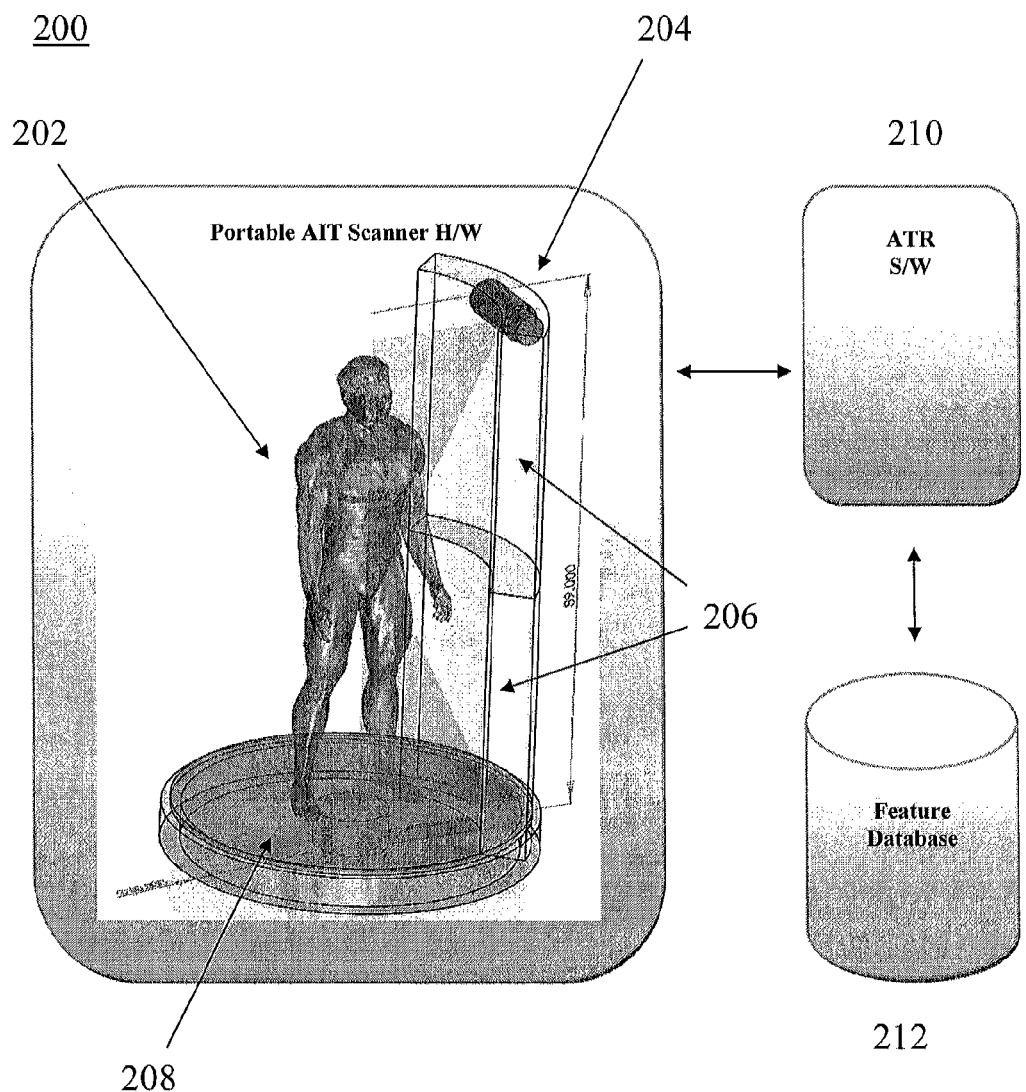
FIG. 2 illustrates a system level diagram of a portable scanner system according to an embodiment of the present disclosure.

FIG. 2 illustrates a system level diagram of a portable scanner system according to an embodiment of the present disclosure. In one embodiment, the present disclosure is directed to a portable scanner system with target recognition capabilities using dual-energy backscatter X-ray imaging technology. Specifically, system 200 includes test subject 202, x-ray tube 204, detector assembly 206, floor assembly 208, target recognition software 210 and feature database 212.

In one embodiment, the detector assembly 206 may have the x-ray tube 204 integrated within it. In one embodiment, the detector assembly 206 and the x-ray tube 203 may be separate. In one embodiment, the detector assembly 206 may be two-stacked, as shown in FIG. 2. In one embodiment, the detector assembly 206 may rotate on the circumference of the circular base of the floor assembly 208, either independently, or when connected to the floor assembly 208, which rotates as well. In one embodiment, the detector assembly 206 may include the x-ray tube 204 and may be configured in a rotating annular shell that can be sectioned into two parts, for portability. That is, the detector assembly 206 (which may include x-ray tube 204 for portability) may be disassembled into two smaller parts which make the parts easy and convenient to carry around and hence portable. In one embodiment, the floor assembly 208 may have a cantilever drive assembly engine that can rotate the detector assembly 206 and the x-ray tube 204 along its circular circumference edge, either alone or together. In one embodiment, the floor assembly 208 may be sectioned off into multiple parts, for example, four parts, for portability. That is, the floor assembly 208 may be disassembled into multiple smaller parts (for example, four) which make the parts easy and convenient to carry around and hence portable. The target recognition software 210 may include software that can automatically detect threats and anomalies. Other components of the system 200 that are not shown in FIG. 2 include the power supply and the screener workstation where the target recognition software 210 and the operation software (e.g., data acquisition software) are hosted. In one embodiment, the external power source required for operation is expected to be the standard 120V AC.

The core technologies that enable the proposed portable scanner system include: a X-ray pencil beam generation and raster scanning that may consist of an X-ray generator, collimators, and a motor to raster in vertical direction. Dual energy backscatter X-ray detection using (enables $Z_{eff}$ computation), that may include two scintillating plastic detectors with photo multipliers; and threat or target recognition capabilities.

In contrast to existing scanners, the vertical raster technique of the present disclosure minimizes the X-ray dose delivered to the subject. Because of the vertical raster, the detectors are only required to have a thin vertical slit to let the fan beam pass through (See, e.g., FIG. 2). A horizontal raster would require a thin horizontal slit, but the detectors would have to move with the X-ray tube for scanning. In addition, as the two X-ray tubes (one on top and another below the floor assembly) have line-of-sight to the top of the head as well as to the bottom of the foot (see FIG. 2), the scanner will be able to inspect both top of the head and bottom of the shoes. The two sides of the subject may also be inspected (due to the rotation of the X-ray generator and detector assembly).

FIGS. 3A, 3B, 3C, 3D, 3E and 3F illustrate different perspective views of a portable scanner system according to an embodiment of the present disclosure. For example, FIG. 3A shows a rendering of the scanner system 300 which includes x-ray tube 304, detector assembly 306, cantilever drive assembly 307, and floor assembly 308. In one embodiment, detector assembly 306 may also include x-ray tube 304 within it and can be treated as one component. In one embodiment, the x-ray tube 304 and the detector assembly 306 may be partitioned and treated as two separate sections for portability. In one embodiment, each of the four parts 304, 306, 307, 308 may be disassembled into conveniently movable modular sections for portability. In one embodiment, the floor assembly 308 may be disassembled into four, conveniently movable parts for portability.

The scanner system 300 includes two essential components: (1) the x-ray tube 304 and the detector assembly 306 that rotates around the test subject 302, and the (2) floor assembly 308 (e.g., which may be a circular platform, as shown in FIGS. 3A-3E) and cantilever drive assembly 307, that rotates the x-ray tube 304 and detector assembly 306. FIGS. 3B-3E show various snapshots of the x-ray tube 304 and detector assembly 306 rotating around the test subject 302. FIG. 3F shows a view of the feet of the test subject 302 from the perspective of a bottom x-ray tube (not shown as an x-ray tube below the floor) indicative of imaging the bottom of the shoes or other footwear, for example.

The operation of the scanner system 300 begins as the test subject 302 steps onto the floor assembly 308 as shown in FIG. 3B. The imaging may be performed with two X-ray generators (top and bottom; the top being, for example, x-ray tube 304 and the bottom being a bottom x-ray tube that is not shown) that are synchronized so that only one generator at a time illuminates the subject. The X-ray is first collimated vertically (thus a fan team as shown) and then rasterized vertically with a chopper wheel. The backscatter X-ray data is collected using a scintillating plastic panel (annular arc) (e.g., detector assembly 306), with a detector efficiency that depends on the thickness and the doping material. The plastic panels transform incoming X-rays into visible light that will be collected by a photomultiplier tube (PMT, not shown). The PMT output is digitized and collected to form one vertical line of the final image. Collection of all such lines while the x-ray tube 304 and detector assembly 306 makes one complete rotation around the subject completes the 2-D image that the target recognition can process. Note that a certain transformation of the collected data will be required before presenting the image to the operator.

Figure 4:
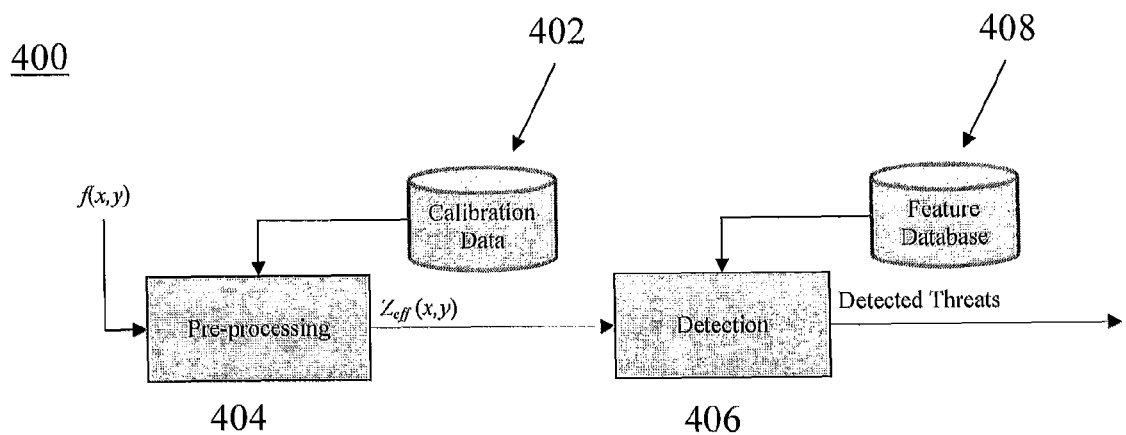
FIG. 4 illustrates a block diagram of a system that performs the overall target recognition processing for the portable scanner system, according to an embodiment of the present disclosure.

FIG. 4 illustrates a block diagram of a system that performs the overall target recognition processing used by the portable scanner system, according to an embodiment of the present disclosure. Target recognition system 400 includes calibration data 402, pre-processing block 404, detection block 406, and feature database 408. The input image (from the scanner system shown in FIGS. 2 and 3A-3E) to the pre-processing block 404 will be f(x,y) (also input to the pre-processing block 404 is the data from calibration data 402) and the output of the pre-processing block 404 will be the atomic number image $Z_{eff}(x,y)$. That is, the input scanner image is transformed to the atomic number image by the pre-processing function of pre-processing block 404. The X-ray data is first normalized so that the dependency of the intensity measurement on distance does not play a role in the processing to follow. The normalized dual energy intensity measurements are then used to construct the $Z_{eff}$ image using a look-up-table. Here, the registration of the data from two x-ray sources, i.e., the pixel-to-pixel correspondence between the two sources (or views) is established to aid the processing to follow.

The detection block 406 performs processing which segments, detects or tags suspect regions from the atomic number image based on at least, an image segmentation library (that holds different shapes, textures, forms of known objects) and a feature database 408 which includes data of known threats. In one embodiment, the image segmentation library may contain algorithms such as, for example, histogram-based segmentation, segmentation by K-means clustering, watershed segmentation, region growing, labeling by connectivity and morphological filters, as well as detecting or segmenting the image based on contours, colors, dotted-lines and reference points. The feature database 408 supplies the detection block 406 with known threats and other information in order for the detection block 406 to better perform detection of suspect regions. In one embodiment, known threats stored in feature database 408 may include, for example, whether a threat is a weapon, liquid, benign, or anomaly, or other attributes that may characterize a threat such as, for example, shape, size, local mean, local variance and texture.

Figure 5A:
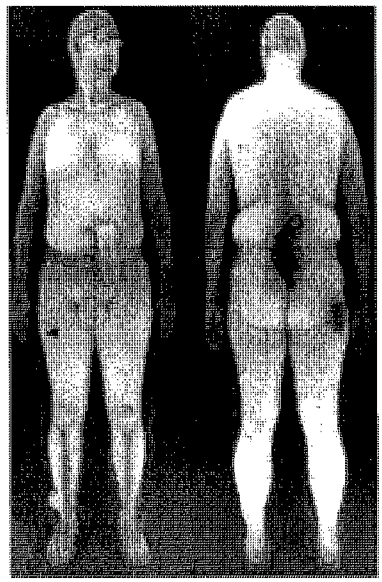
FIGS. 5A, 5B and 5C illustrate examples of an image segmentation library applied to target recognition processed images of the portable scanner system, according to an embodiment of the present disclosure.
Figure 5B:
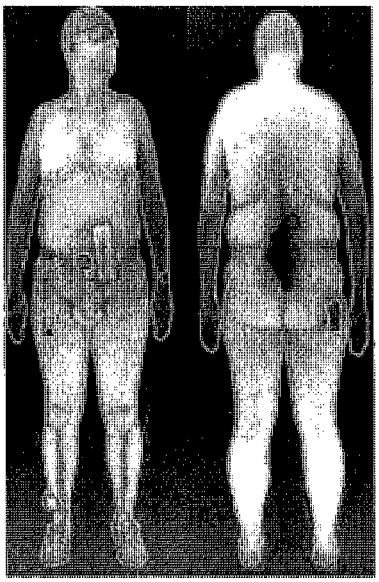
Figure 5C:
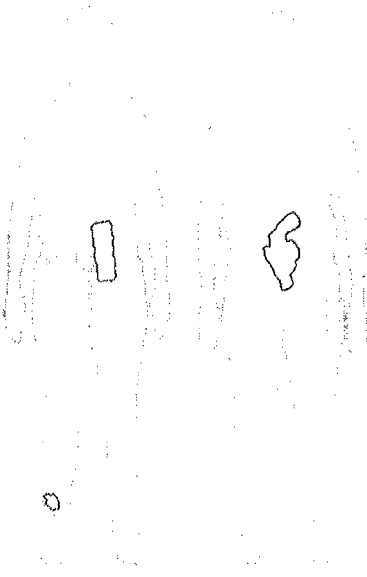

FIGS. 5A, 5B and 5C show examples of an image segmentation library applied to target recognition processed images of the portable scanner system, according to an embodiment of the present disclosure. In one embodiment, the images shown in FIGS. 5A-5C are examples of target recognition processing based on an image segmentation library. The scanned image shown in FIG. 5A may be processed by functions currently available in image segmentation library used by the present disclosure in order to segment the human form and all concealed objects. FIGS. 5B and 5C show that all visually recognizable concealed objects and anomalies have been all detected. Because the implementation of the Detection Processing has not been completed yet in this step, the threats and anomalies have been manually determined and color coded: for example, blue may be used for metallic objects, red may be used for explosives, and yellow may be used for anomalies, for example. Note that if privacy is of concern, only FIG. 5C may be displayed on the screen. FIG. 5A shows the original scanner image. FIG. 5B shows the various boundaries of detected/identified/classified regions overlaid on top of the original scanner image from FIG. 5A. FIG. 5C shows just the boundaries of the scanner images. The human form as recognized by the target recognition algorithm may be indicated in a distinct color, for example, green. Colors may be used to denote the boundaries or interiors of other objects. For instance, blue boundaries or interiors may indicate the presence of a metallic object (such as a gun or other weapon), red may indicate the boundary or interior of possible explosives (ankle explosives, belt explosives), and cyan or yellow may indicate the boundary or interior of possible anomalies that defy ready categorization.

Supporting technologies used by the portable scanner system of the present disclosure may also include a cantilever drive assembly (shown, for example, as 307 in FIGS. 3A-3E) that enables the scanning and the data acquisition system that collects backscatter X-ray data. The components that enable mechanical rotation as well as the data acquisition systems may be standard engineering components. Therefore, the core technology of the portable scanning system may be easily and conveniently integrated with other supporting technologies.

The portable scanner system of the present disclosure is expected to meet the performance requirements as specified in Broad Agency Announcement (BAA) Appendix B, as the following dimensions and weight for various subsystems of the portable scanner system are followed, as shown below.

As mentioned previously, the certain components of the portable scanner system can be constructed using well established, off-the-shelf subsystems that are available today. For the x-ray tubes (for instance elements 204 and 304 discussed above), the specification for X-ray sources for the disclosed design does not require capabilities beyond what is commonly provided by today's standard X-ray generators which are typically used for security scanners. All major vendors of X-ray generators for these applications currently market models that will satisfy the requirements of the portable scanner system of the present disclosure.

As for the detector assembly (for instance elements 206 and 306 discussed above), integrated photomultiplier tube (PMT) modules are available from several vendors which combine PMTs with high voltage power supplies and high bandwidth amplifier circuits. These are mated to commercially available cast-sheet plastic scintillators using optical waveguides, sold for this expressed purpose. While optical scintillation detection of backscatter X-ray does require a detector system with both high sensitivity and relatively fast response, several existing PMT modules have been identified that will satisfy the requirements of the proposed system. These PMT modules supply DC signal output at voltage levels which may be well-suited for digitization with commercial data acquisition boards.

The concept of operation for the proposed portable scanning system may include x-ray tubes and detector assembly with a scan time of about 3-4 seconds in one continuous rotation of the x-ray tube (e.g., 204, 304) and detector assembly (e.g., 206, 306). As just an example, the screening may proceed as follows: (1) Subject removes all extraneous items (e.g., from pockets). Heavy coats would also be removed; (2) Headwear (e.g., wigs) and footwear may be worn (the potable scanning system extracts images from the top of the head and the bottom of the shoes); (3) Subject is scanned with two arms up (similar to the current procedure) in 3-4 seconds, for example; (4) Target recognition processing result is displayed on the screen for the screener using a stick figure, for example, if privacy is a concern; and (5) The subject is either cleared or alarmed (the subject may be patted down if alarmed or must go through additional more stringent screening procedures). However, the procedure outlined herein may be adjusted according to the exact efficiency, privacy or security needs of a particular checkpoint.

All hardware and software components of the portable scanning system with target recognition may be developed in parallel. Each component may be tested independently using a set of unit test plans. When all unit tests have been completed, the individual units/components may be integrated and tested at the system level. The integration testing will be rigorous and will focus on generating the best possible image at the lowest possible dose.

When all subsystems of the scanner are completely integrated, the system level test is performed with target recognition for determining the overall system performance. A set of image data is collected with and without concealed threats. The threat types as well as the locations are stored in a database for generating the receiver operating characteristic (ROC) curve.

One implementation includes one or more programmable processors and corresponding computer system components to store and execute computer instructions. Additional variations and implementations are also possible.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

The invention claimed is:

1. A portable scanning detection system, comprising:
   a floor assembly having a cantilever drive assembly for rotating the floor assembly, the floor assembly partitioned into multiple parts for reassembly;
   at least one x-ray tube oriented towards selected sides of a test subject,
   wherein the at least one x-ray tube emits backscatter pencil beam x-rays formed with vertical slit collimator followed by a rotating disc with radial slits for vertical raster scanning;
   a detector assembly oriented on the circumference of the floor assembly, the detector assembly partitioned into multiple parts for reassembly,
   wherein the detector assembly comprises at least one dual energy backscatter plastic detector screens having photo multiplier tubes, the screens being arranged in a cascade to capture both low and high energy photons independently;
   a storage unit to store images from detected scattered photons on the detector assembly; and
   a processing unit to detect, identify and classify concealed objects on the test subject.

2. The portable scanning detection system of claim 1, wherein the at least one x-ray tube is positioned within the detector assembly.

3. The portable scanning detection system of claim 1, wherein the at least one x-ray tube comprises a top x-ray tube oriented on the top portion of the detector assembly and a bottom x-ray tube positioned below the floor assembly.

4. The portable scanner detection system of claim 1, wherein the floor assembly can be partitioned into four portable parts for reassembly.

5. The portable scanner detection system of claim 1, wherein the detector assembly can be partitioned into two portable parts for reassembly.

6. The portable scanner detection system of claim 1, wherein the processing unit comprises:
   an image calibration database to store image calibration data;
   a feature database to store known threat data;
   a pre-processing unit to receive image data from the storage unit and image calibration data from the database to output an atomic number image; and
   a detection unit to detect threats based from the atomic number image and from known threat data received from the feature database.

7. A computer-implemented method comprising:
   calibrating, via a computing device, received input image information from a portable scanner detection system and image calibration data received from a database into an atomic number image; and
   detecting, via the computing device, threats based of the atomic number image and known threat data received from a feature database,
   wherein the portable scanner detection system comprises:
   at least one x-ray tube configured to emit backscatter pencil beam x-rays formed with vertical slit collimator followed by a rotating disc with radial slits for vertical raster scanning;
   a detector assembly partitioned into multiple parts for reassembly,
   wherein the detector assembly comprises at least one dual energy backscatter plastic detector screens having photo multiplier tubes, the screens being arranged in a cascade to capture both low and high energy photons independently.

8. The computer-implemented method of claim 7, wherein the portable scanner detection system comprises at least one x-ray and a detector assembly, and further wherein calibrating comprises:
   normalizing the received input image information with respect to the received image calibration data; and
   performing registration processing on the received input image information between all the views of the at least one x-ray and the detector assembly.

9. The computer-implemented method of claim 7, wherein detecting comprises using at least one technique selected from an image segmentation library to detect threats, the image segmentation library comprising histogram-based segmentation, segmentation by K-means clustering, watershed segmentation, region growing, labeling by connectivity and morphological filters.

10. The computer-implemented method of claim 7, wherein the known threat data comprises: shape, size, local mean, variance, texture data of the detected suspect regions, threats, benign, liquids, explosives, weapons, and anomalies.

11. A system comprising:
    an image calibration database to store image calibration data;
    a feature database to store known threat data;
    a portable scanner detection system comprising at least one x-ray tube configure to emit backscatter pencil beam x-rays formed with vertical slit collimator followed by a rotating disc with radial slits for vertical raster scanning, a detector assembly and a floor assembly, the detector assembly and the floor assembly being able to be partitioned into parts for reassembly, wherein the detector assembly comprises at least one dual energy backscatter plastic detector screens having photo multiplier tubes, the screens being arranged in a cascade to capture both low and high energy photons independently;
    a pre-processing unit to receive image data from the scanner detection system and image calibration data from the image calibration database to output an atomic number image; and
    a detection unit to detect threats based from the atomic number image and based from the known threat data of the feature database.

12. The system of claim 11, wherein the image calibration database and the feature database are contained in the same database.

13. The system of claim 11, wherein the detector assembly can be partitioned into two portable parts for reassembly and the floor assembly can be partitioned into four portable parts for reassembly.

14. The system of claim 11, wherein the pre-processing unit comprises:
    a normalizing unit to normalize the received input image information with respect to the received image calibration data; and
    a registration processing unit to perform registration processing on the received input image information between all the views of the at least one x-ray and the detector assembly.

15. The system of claim 11, wherein the detection unit comprises using at least one technique selected from an image segmentation library to detect threats, the image segmentation library comprising histogram-based segmentation, segmentation by K-means clustering, watershed segmentation, region growing, labeling by connectivity and morphological filters.

16. The system of claim 11, wherein the known threat data comprises shape, size, local mean, variance, texture data of the detected suspect regions, threats, benign, liquids, explosives, weapons, and anomalies.

17. The system of claim 11, wherein the at least one x-ray tube is positioned within the detector assembly.

18. The system of claim 11, wherein the at least one x-ray tube comprises a top x-ray tube oriented on the top portion of the detector assembly and a bottom x-ray tube positioned below the floor assembly.

* * * * *